252. COMPOSITIONS,
150

Patented Apr. 29, 1930

1,756,311

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

METHOD OF CLEANING METALS

No Drawing.   Application filed February 20, 1929.  Serial No. 341,562.

This invention relates to the art of pickling metals such as iron or steel, that is, to the art of removing scale or rust from the surface of such metals by a process of solution.

It is the common practice to remove scale and rust from the surface of iron or steel by immersion in a dilute solution of sulphuric or muriatic acid, which is frequently heated to a temperature of about 70° C. to accelerate the solution of the iron oxides. However, the pickling acid, in addition to its dissolving action on the oxides, rapidly attacks the metal itself, dissolving it and liberating hydrogen gas. The hydrogen gas escaping from the liquid carries with it some of the acid in the form of a fine mist which is very disagreeable to workmen in the vicinity and which rapidly corrodes all metal in the room or building. The attack and solution of the metal is also undesirable because of the consequent loss of metal and of acid, which cannot economically be recovered, and because of the fact that the process of solution is not uniform, but localized, causing pitting of the surface.

Heretofore the addition to the acid of so-called pickling inhibitors has been proposed, such inhibitors possessing the property of retarding the solution of iron in acid, while not appreciably affecting the solution of its oxides. Among the inhibitors which have been proposed, aldehydes, sugars, proteins, etc. have found considerable commercial use.

This invention consists in adding a small proportion of a member of a new class of extremely effective pickling inhibitors to an acid pickling bath. This class of inhibitors comprises arylamino derivatives of benzothiazoles. The arylamino-benzothiazoles are readily made by oxidizing the corresponding diaryl thioureas, preferably with a halogen such as chlorine or bromine.

For example, anilino-benzothiazole is made by treating a carbon tetrachloride solution of diphenylthiourea (commonly known as thiocarbanilide) with a halogen. The reaction is represented by the following equation:

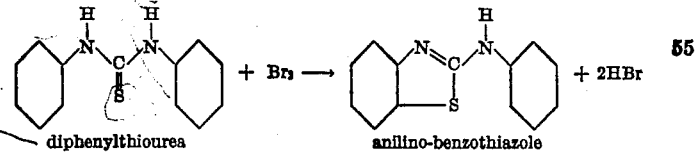

Similar products, containing substituted benzene nuclei, may be prepared from ditolyl-thiourea, diamino-diphenylthiourea, dinaphthyl-thiourea, etc. These arylamino derivatives of benzothiazoles are all extremely effective in retarding the solution of iron in acids, even when employed in very small proportions.

The substances of this class are, in general, basic in their reaction and are fairly soluble in acid solutions. This property is particularly valuable, since it permits the employment of large proportions of the inhibitor without danger of forming a sludge or a surface layer of foam or of greasy droplets which will contaminate the freshly pickled metal as it is withdrawn from the pickling solution. On the contrary, acid solutions containing the above described inhibitors remain perfectly clear.

The following tests illustrate clearly the remarkable efficiency of the products of this invention. Pickling solutions were prepared containing respectively 15% by weight of hydrochloric (muriatic) acid and 10% of sulphuric acid. Each of these was divided into two portions, one of which was used as a control. To the other portion of each solution was added ½% of anilino-benzothiazole. Test pieces of sheet steel, about 2 cm. x 5 cm. in size were cut from a single sheet of metal.

The metal strips were all sand-blasted to remove the scale, were bent at right angles, and placed on edge, each in the bottom of a wide-mouthed bottle. Each bottle was completely filled with one of the acid solutions previously prepared, and closed with a rubber stopper pierced by a bent glass tube so arranged that the hydrogen gas evolved by the reaction of the acid with the metal displaced an equal volume of the liquid, which flowed through the tube into a measuring device. The bottles were then placed in water baths maintained at constant temperatures, and the volume of hydrogen evolved was carefully measured at the expiration of various periods of time. The results are tabulated below:

Volume of hydrogen evolved, in cubic centimeters

| Time of action | 15 min. | 30 min. | 45 min. | 60 min. |
|---|---|---|---|---|
| 15% hydrochloric acid at 40° C | 63 | 132 | 210 | 290 |
| Same with anilino-benzothiazole | 7 | 7 | 7 | 7 |
| 10% sulphuric acid at 60° C | 81 | 100 | 173 | 200 |
| Same with anilino-benzothiazole | 10 | 20 | 25 | 32 |

It is evident that the products of this invention are extremely valuable in preventing the corrosion of iron in acid pickling baths after the scale has been dissolved. However, the addition of such inhibitors has practically no effect on the solution of the scale or other oxide of the metal.

In the practice of this invention on a commercial scale, an acid solution containing hydrochloric or sulphuric acid is prepared in the usual manner and a small proportion of the inhibitor is dissolved therein, for example one pound of the inhibitor to from one hundred to one thousand pounds of acid being used. The metal, which is preferably first degreased by treatment with an organic solvent or with an alkali, is treated in this bath in the customary manner, except that it may be left in the solution for a longer time, since there is little danger of over-pickling. Pitting of the metal is almost completely eliminated, the consumption of acid and of metal is very greatly reduced, and embrittlement of the metal and formation of acid mist due to the evolution of hydrogen gas is largely prevented.

Metals may be pickled or cleaned in the improved pickling solutions, containing the inhibitors of the class hereinabove described, in many widely different manners. For example, the metal may be completely immersed in the acid, if desired, being carried into and out of the solution by automatic devices which also wash and dry the metal; or the solution may be sprayed onto the surface of the metal, and be later washed off by a water spray. The concentration of the acid, and the temperature of the solution may be varied as desired, and the inhibitors may be added in either greater or less proportions than described in the examples above. Even proportions as low as 0.01% of the inhibitor are quite effective, whereas comparatively large proportions, up to several per cent, may be necessary to reduce the corrosion of the metal to an absolute minimum. Although either hydrochloric or sulphuric acid is usually employed in pickling iron, because of the low cost of these substances, any of the other non-oxidizing acids may be substituted therefor in whole or in part. For example, pickling solutions containing phosphoric or hydrofluoric acid are useful in many cases.

I claim:

1. The method of cleaning metals which comprises treating metals with a solution comprising a strong non-oxidizing acid and a small proportion of an arylamino derivative of a benzothiazole.

2. The method of cleaning ferrous metals which comprises treating ferrous metals with a solution comprising a non-oxidizing mineral acid and a small proportion of an arylamino derivative of a benzothiazole.

3. The method which comprises pickling iron or steel in a solution comprising a strong non-oxidizing mineral acid and a small proportion of a substance of the structural formula:

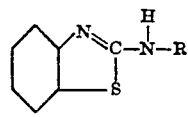

where R represents an aryl group.

4. The method which comprises pickling iron or steel in a solution comprising a strong non-oxidizing mineral acid and a small proportion of anilino-benzothiazole.

5. The method which comprises pickling iron or steel in a solution comprising sulphuric acid and a small proportion of anilino-benzothiazole.

6. A pickling solution comprising a strong acid and a small proportion of an arylamino derivative of a benzothiazole.

7. A pickling solution comprising a strong non-oxidizing acid and a small proportion of a substance of the structural formula:

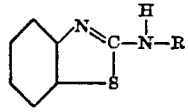

where R represents an aryl group.

8. A pickling solution comprising a strong non-oxidizing acid and a small proportion of anilino-benzothiazole.

9. A pickling solution comprising sulphuric acid and a small proportion of anilino-benzothiazole.

In witness whereof I have hereunto set my hand this 18th day of February, 1929.

WALDO L. SEMON.